United States Patent
Kumar et al.

(10) Patent No.: US 12,187,864 B2
(45) Date of Patent: Jan. 7, 2025

(54) METHOD FOR MANUFACTURING FILMS OF HIGH CONSISTENCY NANOCELLULOSE SUSPENSIONS

(71) Applicant: Teknologian tutkimuskeskus VTT Oy, Espoo (FI)

(72) Inventors: Vinay Kumar, Espoo (FI); Aayush Kumar Jaiswal, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 487 days.

(21) Appl. No.: 17/598,914

(22) PCT Filed: Mar. 31, 2020

(86) PCT No.: PCT/FI2020/050208
§ 371 (c)(1),
(2) Date: Sep. 28, 2021

(87) PCT Pub. No.: WO2020/201627
PCT Pub. Date: Oct. 8, 2020

(65) Prior Publication Data
US 2022/0185975 A1     Jun. 16, 2022

(30) Foreign Application Priority Data
Apr. 5, 2019 (FI) .................................... 20195275

(51) Int. Cl.
*C08J 5/18* (2006.01)
*B29C 43/00* (2006.01)
(Continued)

(52) U.S. Cl.
CPC ............... *C08J 5/18* (2013.01); *B29C 43/003* (2013.01); *B29C 43/24* (2013.01); *B29C 43/28* (2013.01);
(Continued)

(58) Field of Classification Search
CPC ....... B29C 43/24; B29C 43/003; B29C 43/28; B29C 43/305; B32B 37/1027;
(Continued)

(56) References Cited

U.S. PATENT DOCUMENTS 6,162,961 A * 12/2000 Tanner ............... A61F 13/15203
604/374
2002/0117283 A1    8/2002 Soderholm et al.
(Continued)

FOREIGN PATENT DOCUMENTS

JP     H08120593 A     5/1996
JP     2018504529 A    2/2018
(Continued)

OTHER PUBLICATIONS

Abitbol et al.: Nanocellulose, a tiny fiber with huge applications. Current Opinion in Biotechnology. 2016, vol. 39, No. Supplement C, pp. 76-88.

*Primary Examiner* — Philip C Tucker
*Assistant Examiner* — Andrew L Swanson
(74) *Attorney, Agent, or Firm* — Laine IP Oy

(57) ABSTRACT

According to an example aspect of the present invention, there is provided a rapid, economically feasible method for producing continuous films with excellent properties using nanocellulose suspensions at high consistency.

19 Claims, 2 Drawing Sheets

(51) Int. Cl.
*B29C 43/24* (2006.01)
*B29C 43/28* (2006.01)
*B29C 43/30* (2006.01)
*B32B 5/02* (2006.01)
*B32B 23/08* (2006.01)
*B32B 23/10* (2006.01)
*B32B 27/32* (2006.01)
*B32B 27/36* (2006.01)
*C08L 1/02* (2006.01)
*B29K 1/00* (2006.01)
*B29L 7/00* (2006.01)
*B29L 9/00* (2006.01)

(52) U.S. Cl.
CPC .......... *B29C 43/305* (2013.01); *B32B 5/022* (2013.01); *B32B 5/024* (2013.01); *B32B 23/08* (2013.01); *B32B 23/10* (2013.01); *B32B 27/32* (2013.01); *B32B 27/36* (2013.01); *C08L 1/02* (2013.01); *B29K 2001/00* (2013.01); *B29L 2007/008* (2013.01); *B29L 2009/00* (2013.01); *C08J 2301/02* (2013.01); *C08L 2205/02* (2013.01)

(58) Field of Classification Search
CPC . B32B 37/1036; B32B 37/1054; B32B 5/022; B32B 5/024; B32B 23/08; B32B 23/10; B32B 27/32; B32B 27/36; C08J 5/18; C08J 2301/02; C08L 1/02; C08L 2205/02; B29L 2009/00
See application file for complete search history.

(56) References Cited

U.S. PATENT DOCUMENTS

| | | | |
|---|---|---|---|
| 2010/0124651 A1* | 5/2010 | Rousseau | C08J 5/18 |
| | | | 977/890 |
| 2011/0293932 A1 | 12/2011 | Jiang et al. | |
| 2013/0047893 A1* | 2/2013 | Heiskanen | D21H 11/20 |
| | | | 106/491 |
| 2013/0288133 A1* | 10/2013 | Imai | H01G 9/02 |
| | | | 429/255 |
| 2017/0342661 A1* | 11/2017 | Aulin | D21H 27/10 |
| 2018/0141009 A1 | 5/2018 | Guerin et al. | |
| 2018/0187375 A1 | 7/2018 | Pfitzner et al. | |
| 2019/0002658 A1 | 1/2019 | Kunnari et al. | |
| 2021/0244069 A1* | 8/2021 | Iodice | B32B 5/02 |

FOREIGN PATENT DOCUMENTS

| | | |
|---|---|---|
| JP | 2018527483 A | 9/2018 |
| JP | 2019501255 A | 1/2019 |
| WO | WO2011093510 A1 | 8/2011 |
| WO | WO2017/115020 A1 | 7/2017 |
| WO | WO2017221137 A1 | 12/2017 |
| WO | WO2018092056 A1 | 5/2018 |
| WO | WO2018138708 A1 | 8/2018 |
| WO | WO2018211441 A1 | 11/2018 |

\* cited by examiner

METHOD FOR MANUFACTURING FILMS OF HIGH CONSISTENCY NANOCELLULOSE SUSPENSIONS

FIELD

The present invention relates to methods for manufacturing films of high-consistency nanocellulose suspensions.

BACKGROUND

Nanocellulose films are suitable for various applications such as, barriers in packaging, biomedicine, substrates for printed electronics and sensors, filtration membranes, optoelectronics, etc. [1]. Nanocellulose films are strong and transparent, and they exhibit functionalization ability, along with excellent barrier properties against air, oxygen, mineral oil and grease. Therefore, these films have potential to be an excellent alternative to non-biodegradable and petroleum-based plastics in the various applications mentioned above.

Until now, the production of such films had been possible only by using nanocellulose suspensions at low consistency (0.1-3%), because the high viscosity and yield stress of nanocellulose suspensions at higher concentrations pose challenges to film formation. The rheological behaviour of high consistency nanocellulose suspensions is not suitable for conventional film forming methods like knife, blade, flexography, reverse gravure, etc., and therefore, the material is diluted to produce films. However, these dilute suspensions demand an enormous drying capacity and such large drying sections are often not feasible to build in a continuous process. Furthermore, issues related to shrinkage during drying lead to poor film quality.

WO 2017/115020 A1 describes a method of producing films from high-consistency enzyme fibrillated cellulose [2]. Such method with high consistency nanocellulose raw material enables production of films in a process which consumes less energy compared to traditional methods, because the raw material contains less water to evaporate. However, the method is for example silent on how to ensure a homogenous and defect-free wet film. Furthermore, the method either suggests dilution of the raw material to achieve a viscosity where it can be casted on a metal belt or to use an extrusion device to form a film.

WO 2016/174348 A1 describes a process for manufacturing a laminate material comprising of a fibrillated cellulose layer [3]. The process describes draining water from a dilute suspension of fibrillated cellulose (0.1-4% consistency), by depositing the material on a porous substrate in order to obtain a 5-18% dry fibre mat. The method, however, does not deal with avoiding shrinkage during drying of the wet fibre mat. Additionally, the method does not describe the production of standalone films.

WO 2018/092056 A1 describes a process of forming nanocellulose films by draining a dilute suspension over a porous support (wire forming) or by casting a dilute suspension over a non-porous substrate (cast forming) [4]. However, the use of high consistency suspensions is not mentioned in the method. Additionally, the issue of wire mark replication on the film is not addressed.

WO 2018/138702 A1 describes a process similar to WO 2018/092056 A1 but with a minor difference of casting multiple layers of wet nanocellulose on top of a non-porous substrate to obtain a film with oxygen transmission rate of less than 10 ml/m$^2$·day at 50% relative humidity [5]. Even in this method, the use of high consistency suspensions is not mentioned.

Thus, there is a need for a continuous process for manufacturing strong, defect-free films using high consistency nanocellulose suspensions in order to ensure energy and cost efficient production of such films.

SUMMARY OF THE INVENTION

The invention is defined by the features of the independent claims. Some specific embodiments are defined in the dependent claims.

According to an aspect of the present invention, there is provided a method for producing films of nanocellulose suspensions at high consistency.

According to another aspect of the present invention, there is provided a method for producing continuous films from nanocellulose suspensions, which can be cellulose nanofibrils (CNF), microfibrillar cellulose (MFC), cellulose nanocrystals (CNC), or bacterial cellulose suspensions.

Here the combination of a) high-consistency starting material, b) substrate materials with specific surface and bulk properties, and c) film formation restricted within appropriate gaps results in rapid roll-to-roll production of stand-alone films with adjustable thickness, and reduced drying energy demand as compared to existing methods using similar but low-consistency starting materials.

These and other aspects, together with the advantages thereof over known solutions are achieved by the present invention, as hereinafter described and claimed.

The method of the present invention is mainly characterized by what is stated in the characterizing part of claim 1.

Considerable advantages are obtained by means of the invention. For example, the process of the present invention utilizes existing process infrastructure, reduces drying energy demand by using high-consistency starting suspensions and allows production of continuous barrier films from nanocellulose, wherein the film formation process is not limited by the line speed. In addition, the continuous films produced are defect-free, homogenous, and possess well-controlled properties and thereby usable in, for example, purposes required by packaging, biomedical, and electronics industries.

Next, the present technology will be described more closely with reference to certain embodiments.

EMBODIMENTS

The present technology provides a method for producing defect-free nanocellulose films at 10% or higher consistency. The process allows rapid roll-to-roll production of stand-alone nanocellulose films. High consistency of the raw material reduces the drying energy demand, and provides a film formation process, which is not limited by the line speed.

Nanocellulose: material composed predominantly of cellulose, with any external dimension in the nanoscale, or a material having internal structure or surface structure in nanoscale, with the internal structure or surface structure composed predominantly of cellulose. An alternative term for nanocellulose is cellulose nanomaterial. [6]

Micro/nanofibrillar cellulose: A heterogeneous nanomaterial composed of micrometric size elements (fiber fragments) and at least 50% by number of nano-objects (i.e. objects having at least one dimension between 1 and 100 nanometers). These cellulose nano-objects are called micro fibrils (MFC) or nano fibrils (NFC or CNF) which typically have diameter in the order of 3 to 100 nm and length of 0.5 to 100 μm [3], [6].

Nanocrystalline cellulose: A type of cellulose nanofiber with pure crystalline structure with dimensions of 3 to 50 nm in width and 100 nm to several micrometers in length. The term nanocrystalline cellulose (NCC) is synonymous with term cellulose nanocrystal (CNC).

Nanocellulose suspension: Aqueous or solvent-based suspension of nanocellulose, whose consistency is defined as the mass percentage of dry matter in the total suspension.

Additive (in the present context): A material added to nanocellulose suspensions to alter physical or chemical properties of the original suspension and which will be incorporated in the film produced in the process. Examples of additives are binders, dispersants, mineral particles, metal oxides, plasticizers, rheology modifiers, crosslinking agents, antimicrobial agents, etc. but not limited to only these.

Substrate (in the present context): A material web which supports the feed material and the subsequently formed film, throughout the process. The substrate can either be separated or can be left attached to the produced film at the end of the process. Examples of substrates are metals, plastics, polymer membranes, paperboard, woven and non-woven fabrics or felts, etc. but not limited to only these.

Figure 1:
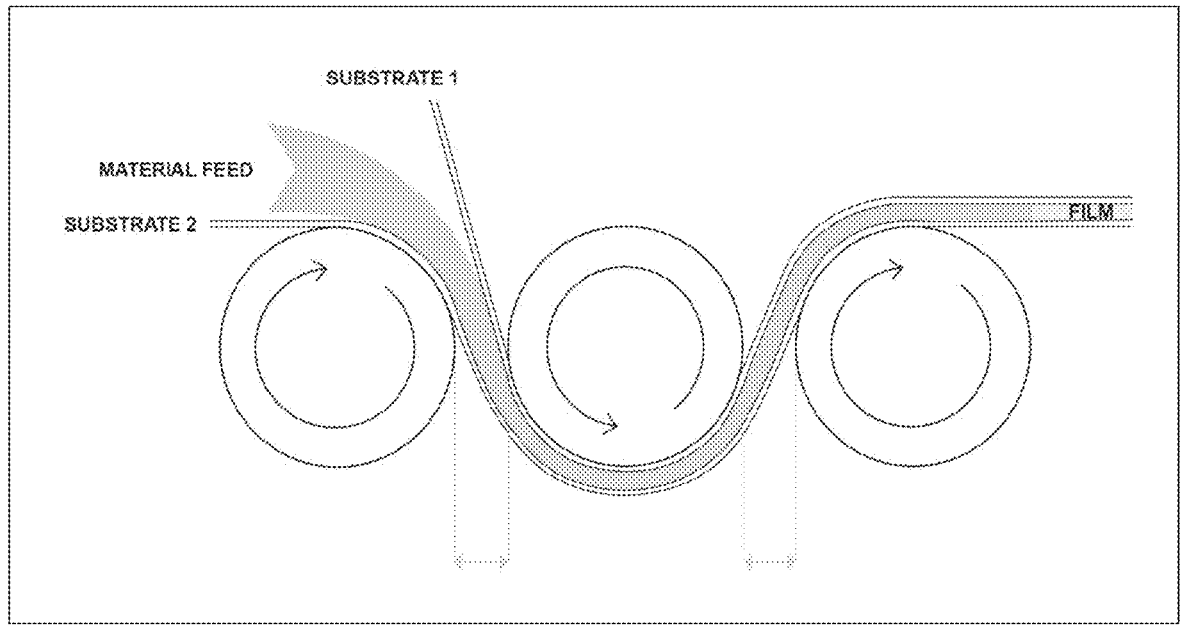
FIG. 1 is a schematic of film forming assembly in Example 1.
Figure 2:
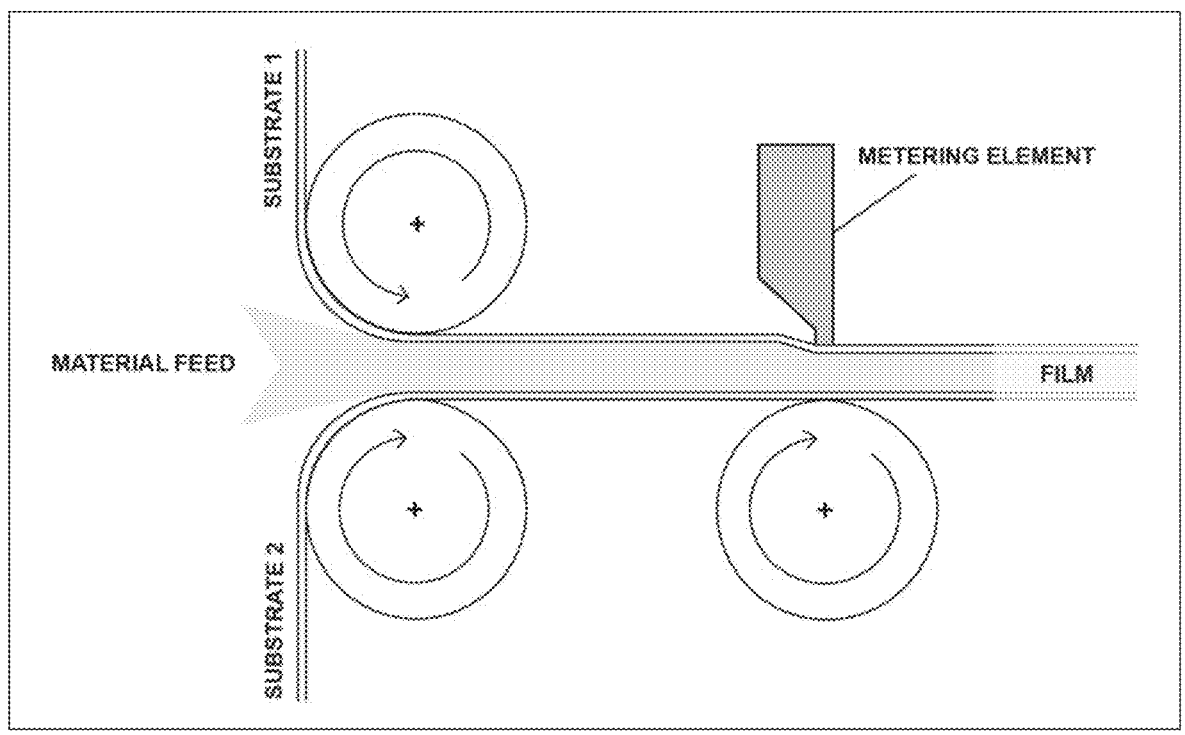
FIG. 2 is a schematic of film forming process in Example 2.
Figure 3:
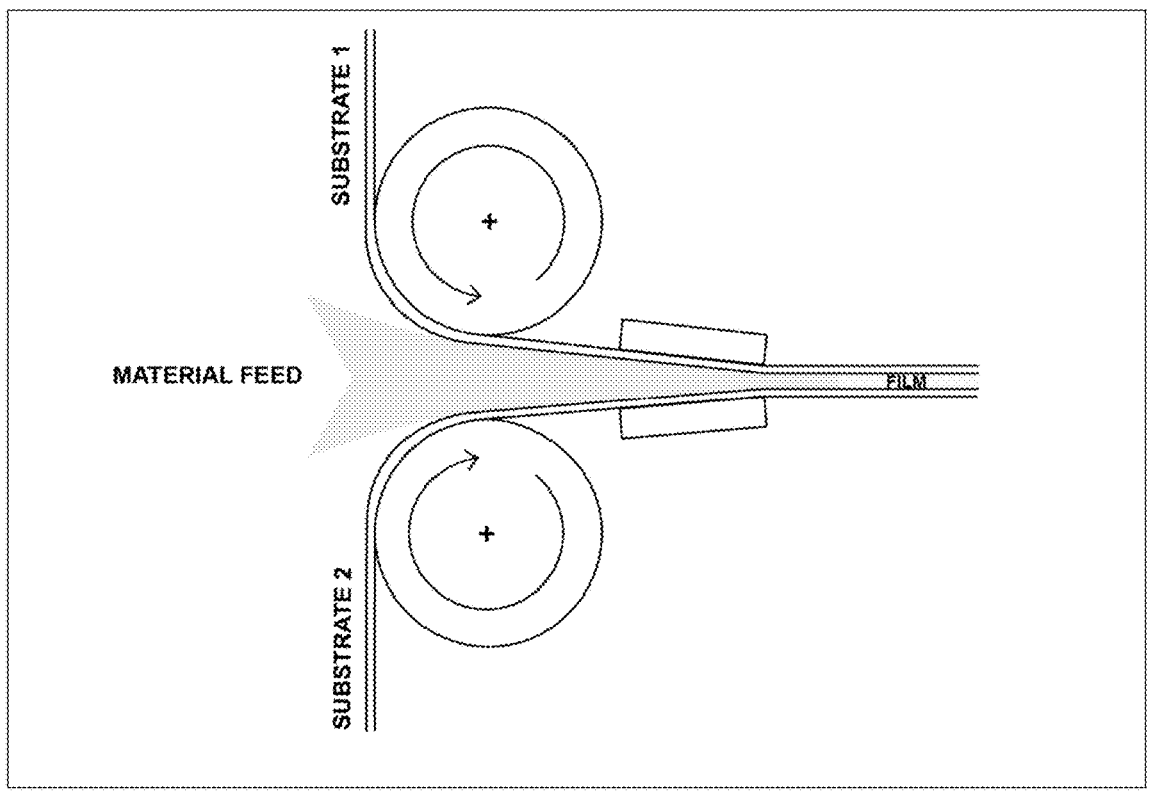
FIG. 3 is a schematic of film forming process in Example 3.

FIGS. 1, 2, and 3 are illustrative and not restrictive and thus, do not represent the only possible machine assemblies. The manufacturing of fibrillated cellulose films can be accomplished by using different arrangements of the metering system than the ones shown schematically, while staying under the scope of the present invention.

Figure 4:
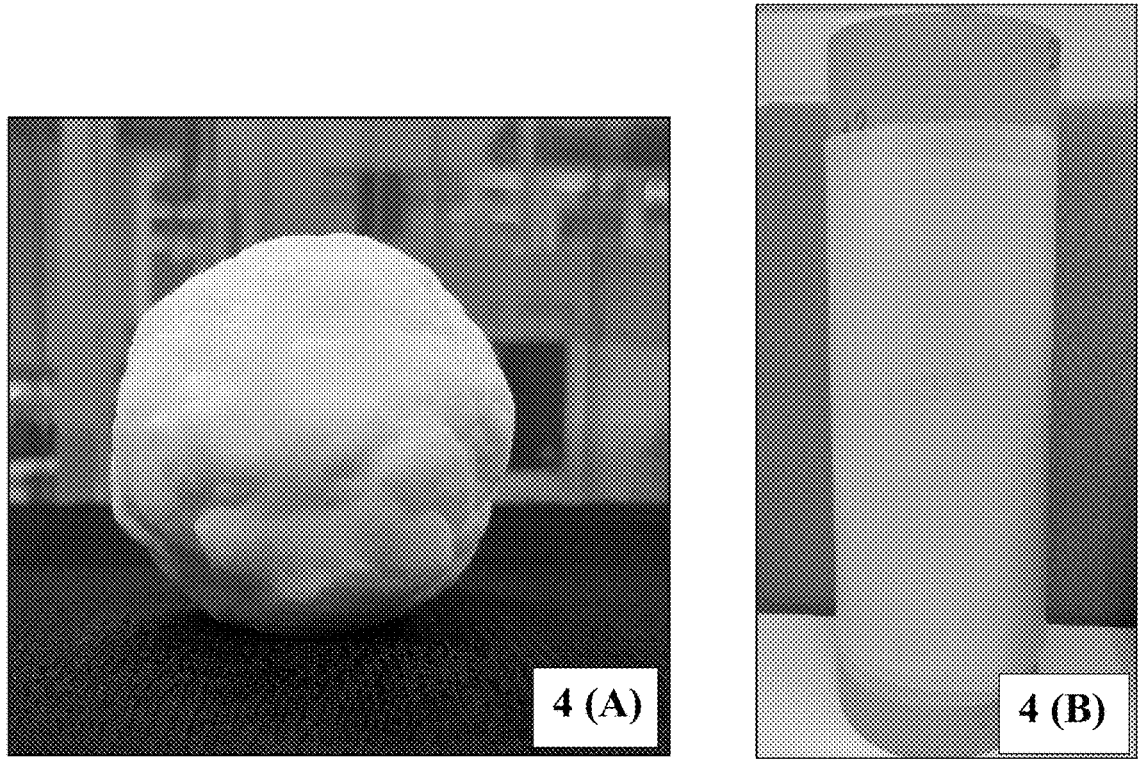

FIG. 4 (A) shows an example of visual appearance of CNF material at 10% solids and 4 (B) shows an example of a nanocellulose film produced by using the presented method.

The present invention is based on the following process steps:

Nanocellulose is mixed with selected additives, such as carboxymethyl cellulose (CMC) and sorbitol, in optimum amount to obtain a suspension at least 5%, preferably at least 10% solids by weight. At this consistency, the suspensions are highly viscous and have a paste-like character, hence, mixing is facilitated by using a special disintegration process, which also breaks down any soft fiber flocs.

The high consistency suspension is then fed between two substrates, where one substrate is preferably porous and the other substrate is non-porous. This creates a multi-layer structure, wherein the suspension lies between the two substrates. Thus, herein the multi-layer structure should be understood as an intermediate structure consisting of the material feed and the substrates 1 and 2, as described e.g. in FIGS. 1-3. The pore size of the porous substrate must not be bigger than the dimensions of the nanocellulose fibers, in effect to allow only water to pass through the substrate. It is also possible to choose both substrates to be porous.

The multi-layer structure is then passed through one or more nips (shown by reference numerals 3, 4, and 5 in FIG. 1) with subsequently reducing gaps or with a long dwell time nip with continuously reducing gap to form a continuous film. Film thickness is controlled by adjusting the nip gaps during film formation. It should be noted that the topographical difference between the two surfaces plays an important role in film spreading and formation, and eliminates defects.

The multi-layer structure is then dried as such with external heating with the porous substrate allowing water evaporation through itself and the confinement of the film between the two substrates preventing any shrinkage in the film.

The dried defect-free nanocellulose film is removed by peeling away both the substrates, which can be reused in the same process multiple times. It must be noted that it is possible to extract the film from the multi-layer structure even in semi-dry state (20-70% dryness), if required.

Thus, according to one embodiment of the present invention, the present method comprises at least the following steps:

Using nanocellulose with or without additives to obtain a homogenous suspension having at least 5%, preferably higher than 10% consistency, feeding the suspension between two substrates, with at least one substrate being porous, to obtain a multi-layer structure, wherein the suspension is located between the two substrates, passing the multi-layer structure through one or more nips with successively reducing gaps to form a continuous film structure, drying the continuous film structure with heat or under ambient conditions, and separating the film by peeling away both substrates or transferring a semi-dry film (20-70% dryness) to a third substrate.

In a preferred embodiment of the present invention, the nanocellulose material is either cellulose nanofibrils (CNF), microfibrillar cellulose (MFC), cellulose nanocrystal (CNC), or bacterial cellulose suspensions.

In one embodiment of the present invention, the additives are selected from sorbitol and carboxymethyl cellulose (CMC), however the selection of additives is not limited to these materials. Examples of other suitable additives are glycerol, polyvinyl alcohol (PVA), carrageenan, calcium carbonate, talc, kaolin, starch, etc.

In one embodiment of the present invention, the mass percentage of nanocellulose or microcellulose is between 50-100% of the total suspension while rest of the mass consists of additives.

In one embodiment of the present invention, the fibrillated cellulose consistency i.e. the solids content of the suspension being used for film production is in the range of 5-60%, preferably at least 10% by weight.

In one embodiment of the present invention, at least one substrate is porous and the surface roughness of both substrates lies in the range of 0.1-10 μm. Herein the surface roughness is defined for the surfaces of the substrates which lie in contact with the feed suspension. Substrate surface roughness is an important factor regarding the film roughness, spreading, and formation.

In one embodiment of the present invention, the process comprises at least two roller nips, for producing nanocellulose films. However, there can also be only one long dwell time nip to obtain a similar effect as roller nips. A combination of roller nips, long dwell nips, and metering elements such as blades, knives, rods, etc. can also be used to produce films using the presented invention. The use of long dwell time nip or multiple roller nips further improves the properties of the produced film, for example in terms of homogeneity and smoothness.

In one embodiment of the present invention, the film thickness is controlled by adjusting the nip gaps according to the desired thickness of the end-product. The final film thickness between 10-500 μm belongs to the scope of the presented invention.

In one embodiment of the present invention, the continuous multi-layer structure is dried with external heating, preferably comprising of contact-drying, infrared drying, and hot-air impingement drying or a combination of these. The porous substrate allows water evaporation through itself and the adhesion forces between the wet film and the substrates in the multi-layer structure prevent any shrinkage in the film.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated.

The presented working examples are illustrated in a horizontal configuration but the applicability of the presented technology is not limited to horizontal configurations. The technology of the present invention can directly be used in inclined or vertical configurations.

INDUSTRIAL APPLICABILITY

Nanocellulose films produced using the present invention possess good mechanical strength and exhibit excellent barrier properties against air, oxygen, mineral oil and grease. They are among the front-running candidates for replacing non-biodegradable petroleum based plastic layers in packaging products. Additionally, they find applications in electronics, biomedicine, energy storage, construction, filtration and logistics industries.

EXAMPLES

The process according to the present invention can be divided into two operations:
1. Preparation of high consistency feed mixture
2. Film forming method 1. Preparation of High Consistency Feed Mixture The total consistency of the final mixture being used for film production can be in the range of 5-60%. Of the dry matter in the final mixture, the mass percentage of nanocellulose can be between 50-100% while rest of the mass comprises of additives. The nature of additives can be organic or inorganic. Homogenous mixing of additives with the nanocellulosic material must be ensured in order to obtain uniform films. An example recipe is shown in Table 1.

TABLE 1

Example recipe for high consistency nanocellulose feed mixture

| Component | Amount (parts per hundred) | Solid content (%) |
|---|---|---|
| Microfibrillar cellulose (MFC) | 100 | 10 |
| Carboxymethyl cellulose (CMC) | 1 | 2 |
| Sorbitol | 20 | 50 |
| Total | 121 | 10 |

2. Film Forming Method

Two substrates are needed to form a film with the presented method. At least one among the two substrates must be porous, with mean pore size less than 10 μm. The substrates can be either woven or non-woven materials. The feed material is constrained between the two substrates to create a sandwich structure and subsequently, the sandwich structure is compressed using a metering element to obtain a wet film of desired thickness.

Example 1

1) Microfibrillar cellulose (MFC) was mixed with aqueous suspensions of CMC and Sorbitol in 100:1:20 ratio by dry mass to obtain a feed mixture at 10% consistency. At this consistency, the mixture was highly viscous and mixing was facilitated by the use of a high consistency mixer (Winkworth sigma blade mixer) which also breaks down soft fibre flocs.

2) The high consistency feed mixture was then fed between two substrates (Substrate 1 and Substrate 2), where Substrate 1 is a porous filtration membrane and Substrate 2 is polypropylene (PP). Hence, a multi-layer structure was created.

3) The multi-layer structure was then passed through roller nips with successively reducing gaps to form a continuous and uniform film (see FIG. 1). The excessive feed material exited the multi-layer structure through extrusion from the edges, where it was collected for recirculation. Thickness of the film was controlled by adjusting the gaps in the two nips, where the gap between the surfaces of Roller 1 and Roller 2 was greater than the gap between Roller 2 and Roller 3. In this case, the nip gaps were set at 1 mm and 500 μm respectively. Only two nips are shown in the current example, however multiple number of nips is possible to be used.

4) Further, the multi-layer structure was taken to the drying section. A combination of infrared and hot-air impingement drying was used for drying. The porous substrate allowed water evaporation through itself and permitted drying, while the confinement between the two substrates avoided any shrinkage in the film.

5) The dried MFC film was then extracted by peeling away Substrate 1 and Substrate 2.

Example 2

1) Enzymatically fibrillated cellulose was mixed with aqueous suspensions of CMC and Sorbitol to obtain a feed mixture at 20% consistency. Here, the mass percentage of fibrillated cellulose was 82% of the total dry mass in the mixture. Mixing was facilitated by the use of a high consistency mixer.
2) The high consistency feed mixture was then fed between two substrates (Substrate 1 and Substrate 2), where Substrate 1 is a porous filtration membrane and Substrate 2 is polyethylene terephthalate (PET). Hence, a multi-layer structure was created.
3) Only one set of nip and knife is shown in the current example, however multiple number of nips and metering elements are possible to be used.
4) The multi-layer structure was then passed through a roller nip with subsequent formation done using a rigid knife to form a uniform film (see FIG. 2). The excessive feed material exited the sandwich structure through extrusion from the edges of the web, where it was collected for recirculation. Thickness of the film was controlled by adjusting the gap between rollers and under the metering knife, where the gap between the rollers is greater than the gap under the metering element. In this case, the nip gaps were set at 1 mm and the knife gap at 500 μm. Only one set of nip and metering knife is shown in the current example, however multiple number of nips and metering elements are possible to be used.
5) The multi-layer structure was then taken to the drying section. A combination of infrared and hot-air impingement drying was used for drying. The porous substrate allowed water evaporation through itself and permitted drying, while the confinement between the two substrates avoided any shrinkage in the film.
6) The dried fibrillated cellulose film is then extracted by peeling away Substrate 1 and Substrate 2.

Example 3

1) Fibrillated cellulose was mixed with aqueous suspensions of CMC and Sorbitol to obtain a feed mixture at 20% consistency. Here, the mass percentage of fibrillated cellulose is 82% of the total dry mass in the mixture. Mixing was facilitated by the use of a high consistency mixer.
2) The high consistency feed mixture was then fed between two substrates (Substrate 1 and Substrate 2), where Substrate 1 is a porous filtration membrane and Substrate 2 is polyethylene terephthalate (PET). Hence, a multi-layer structure was created.
3) The multi-layer structure was then passed through a long dwell time nip with continuously reducing gap where the lowest gap determines the final film thickness. This section is termed as the forming section. The current example shows the described configuration achieved through pressing the multi-layer structure using a long dwell time nip (see FIG. 3). The excessive feed material exited the sandwich structure through extrusion from the edges of the web, where it was collected for recirculation. Thickness of the film was controlled by adjusting the gap in the nip at the end of the forming section. Only one forming section is shown in the current example, however multiple forming sections are possible to be used.
4) The multi-layer structure was then taken to the drying section. A combination of infrared and hot-air impingement drying was used for drying. The porous substrate allowed water evaporation through itself and permitted drying, while the confinement between the two substrates avoided any shrinkage in the film.
5) The dried fibrillated cellulose film is then extracted by peeling away Substrate 1 and Substrate 2.

FIG. 4 (B) shows the film manufactured using the process described in Example 1. The basis weight for this film was found to be 50 g/m$^2$, air permeance was 0.003 μm/Pa·s, which is the detection limit of the used instrument (L&W Air permeability tester SE-166), nevertheless indicating that the film is free of pinholes. KIT value was measured in accordance with TAPPI standard (T 559) and was found to be 12, confirming excellent grease barrier. The oxygen transmission rate (OTR) was less than 1 cc/m$^2$·d·atm at 23° C. and 50% relative humidity when measured in accordance with ASTM D 3985-17 procedure. The average tensile strength in machine direction was 54.7 MPa when measured using a strain rate of 10 mm/min and span length of 10 cm. The tensile strength could be further improved by ensuring proper mixing of the raw material with other components and by removing any air entrapped within the material.

CITATION LIST

Patent Literature

[2] V. Kunnari, J. Pere, J. Hiltunen, and K. Kemppainen, "Method of producing films from high consistency enzyme fibrillated nanocellulose," WO 2017/115020 A1, 2017.
[3] D. Guerin, Y. Rharbi, P. Huber, and V. Meyer, "Process and device for manufacturing a laminated material comprising a fibrillated cellulose layer," US 2018/141009 A1.
[4] I. Heiskanen, K. Backfolk, E. Saukkonen, V. Ribu, and K. Lyytikäinen, "Method for making a film comprising MFC," WO 2018/092056 A1, 2018.
[5] L. Axrup, K. Isabel, C. Aulin, M. Hillergren, and T. Lindström, "Method of manufacturing a film comprising microfibrillated cellulose," WO 2018/138702 A1, 2018.

Non-Patent Literature

[1] T. Abitbol et al., "Nanocellulose, a tiny fiber with huge applications," *Current Opinion in Biotechnology*, vol. 39, no. Supplement C. pp. 76-88, 2016.
[6] ISO, "ISO/TS 20477:2017 Nanotechnologies—Standard terms and their definition for cellulose nanomaterial," *International Organization for Standardization*. ISO, 2017.

The invention claimed is:
1. A method for manufacturing films from nanocellulose comprising:
  feeding a nanocellulose suspension comprising modified or unmodified nanocellulose, with or without additives, and having at least 5 wt. % total solids, between two substrates, wherein at least one substrate is porous, to obtain a multi-layered structure, and
  passing the multi-layered structure through one or more nips defining controlled gap(s) to form a film, wherein the feeding and passing take place before any drying of the nanocellulose.
2. The method according to claim 1, wherein the nanocellulose comprises cellulose nanofibrils (CNF), microfibril- lar cellulose (MFC), cellulose nanocrystals (CNC), bacterial cellulose suspensions, or any mixture of these, in modified or unmodified form.

3. The method according to claim 1, wherein the mass percentage of the nanocellulose is at least 50% of the total dry mass of the suspension.

4. The method according to claim 1, wherein the consistency of the nanocellulose suspension being used for film formation is in the range of 5-60%.

5. The method according to claim 1, further comprising controlling film thickness by adjusting the nip gaps.

6. The method according to claim 1, wherein the film is dried at ambient conditions or using external heating.

7. The method according to claim 1, further comprising separating the film from the two substrates, keeping the film attached to either substrate, or transferring the film as a semi-dry or a fully dry film to a third substrate.

8. The method according to claim 1, wherein the consistency of the nanocellulose suspension is at least 10%.

9. The method according to claim 1, wherein the two substrates comprise a porous substrate and a nonporous substrate.

10. The method according to claim 9, wherein the porous substrate comprises pores having a smaller pore size than the dimensions of the modified or unmodified nanocellulose.

11. The method according to claim 1, wherein the two substrates each have a surface roughness in the range of 0.1-10 μm.

12. The method according to claim 1, wherein the formed film has a thickness of 10-500 μm.

13. The method according to claim 1, wherein the additives are present in the suspension, and wherein the additives comprise at least carboxymethyl cellulose (CMC) and sorbitol.

14. The method according to claim 1, wherein the one or more nips comprises a plurality of nips, wherein a predetermined distance exists between respective pairs of the nips, and wherein the predetermined distance between the respective pairs of the nips decreases in a flow direction of the multi-layered structure through the plurality of nips.

15. The method of claim 1, further comprising, after the feeding and passing steps, drying the film.

16. A method for manufacturing films from nanocellulose comprising:
 feeding a nanocellulose suspension comprising modified or unmodified nanocellulose, with or without additives, between two substrates, wherein at least one substrate is porous, to obtain a multi-layered structure, and
 passing the multi-layered structure through one or more nips defining one or more controlled gaps to form a film,
 wherein the nanocellulose suspension has a solids content of at least 12% by weight, and
 wherein the feeding and passing take place before any drying of the nanocellulose.

17. The method of claim 16, wherein the nanocellulose suspension has a solids content of at least 15% by weight.

18. The method of claim 16, wherein the nanocellulose suspension has a solids content of 20-60% by weight.

19. A method for manufacturing films from nanocellulose comprising:
 feeding a nanocellulose suspension comprising modified or unmodified nanocellulose, with or without additives, and having at least 5 wt. % total solids, between two substrates, wherein at least one substrate is porous, to obtain a multi-layered structure,
 passing the multi-layered structure through one or more nips defining one or more controlled gaps to form a film, and
 only after the feeding and passing, drying the formed film.

* * * * *